(12) United States Patent
Onodera et al.

(10) Patent No.: US 9,891,033 B2
(45) Date of Patent: Feb. 13, 2018

(54) TILT ANGLE ADJUSTER FOR FORM MEASURING DEVICE

(71) Applicant: Mitutoyo Corporation, Kanagawa (JP)

(72) Inventors: Youhei Onodera, Kure (JP); Nobuyuki Hama, Higashihiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 193 days.

(21) Appl. No.: 15/083,668

(22) Filed: Mar. 29, 2016

(65) Prior Publication Data
US 2016/0290778 A1    Oct. 6, 2016

(30) Foreign Application Priority Data

Mar. 31, 2015 (JP) ................. 2015-072320

(51) Int. Cl.
| | | |
|---|---|---|
| G01B 7/34 | (2006.01) | |
| G01B 5/28 | (2006.01) | |
| G01B 21/04 | (2006.01) | |
| G01B 5/00 | (2006.01) | |

(52) U.S. Cl.
CPC ........... *G01B 5/285* (2013.01); *G01B 5/0004* (2013.01); *G01B 5/28* (2013.01); *G01B 21/047* (2013.01)

(58) Field of Classification Search
None
See application file for complete search history.

(56) References Cited

U.S. PATENT DOCUMENTS

| | | | | |
|---|---|---|---|---|
| 2003/0217592 | A1* | 11/2003 | Nagaike | G01B 3/008 73/104 |
| 2015/0025845 | A1* | 1/2015 | Mansfield | G01B 21/042 702/168 |

FOREIGN PATENT DOCUMENTS

JP    5000894    8/2012

* cited by examiner

*Primary Examiner* — Robert R Raevis
(74) *Attorney, Agent, or Firm* — Greenblum & Bernstein, P.L.C.

(57) ABSTRACT

A tilt angle adjuster includes a base plate attached to a Z slider; a hanging plate attached to a measuring device main body; a thin coupling plate supporting the hanging plate such that the hanging plate is suspended on a first surface side of the base plate; biasers biasing the hanging plate so as to impart a rotational force in a first direction to the hanging plate; and a micrometer head provided so as to push the hanging plate one of directly and indirectly toward a second direction opposite the direction of the rotational force imparted by the biasers.

14 Claims, 14 Drawing Sheets

PRIOR ART

TILT ANGLE ADJUSTER FOR FORM MEASURING DEVICE

CROSS-REFERENCE TO RELATED APPLICATIONS

The present application claims priority under 35 U.S.C. § 119 of Japanese Application No. 2015-072320, filed on Mar. 31, 2015, the disclosure of which is expressly incorporated by reference herein in its entirety.

BACKGROUND OF THE INVENTION

1. Field of the Invention

The present invention relates to a tilt angle adjuster for a form measuring device.

2. Description of Related Art

Known examples of form measuring devices include a surface characteristic measuring apparatus which measures surface roughness, unevenness, and undulation (Japanese Patent No. 5,000,894). The surface characteristic measuring apparatus supports a stylus having a contact pin at a forefront end such that the stylus is capable of swinging, and detects roughness, unevenness, and undulation of a surface of a measured object based on an amount of swing of the stylus when the contact pin profiles and scans over the surface of the measured object. FIG. 1 illustrates a conventional surface characteristic measuring apparatus 50. The surface characteristic measuring apparatus 50 is provided with a measuring device main body 10 and a support stand 20.

The measuring device main body 10 includes a stylus 12 having a contact pin 11 at a forefront end; a detection portion 13 swingably supporting the stylus 12 and also detecting an amount of swing of the stylus 12; and an X slide mechanism 14 advancing and withdrawing the detection portion 13 in an X axis direction.

In FIG. 1, the X axis runs from left to right, a Y axis runs from a front to a back of the drawing sheet, and a Z axis runs from a bottom upwards.

The support stand 20 includes a base 21; a Z column 22 standing upright on the base 21; and a Z slider 23 provided so as to be capable of rising and lowering in a vertical direction (Z axis direction) on the Z column 22.

In this example, the X slide mechanism 14 is mounted to the Z slider 23 and the measuring device main body 10 is supported on the support stand 20, but this does not mean that the X slide mechanism 14 is attached directly to the Z slider 23. Instead, a swivel plate 30 is interposed between the Z slider 23 and the X slide mechanism 14. The swivel plate 30 enables the measuring device main body 10 to tilt with an axis parallel to the Y axis as a rotation axis. In a case where a measured surface W1 is an inclined surface, for example, the X slide mechanism 14 is tilted by the swivel plate 30 such that the measured surface W1 and a drive direction of the X slide mechanism 14 are parallel. Accordingly, the roughness, unevenness, and undulation of the measured surface W1 are brought into a vertical movement range (measurement range) of the stylus 12, enabling tracing measurement of the inclined measured surface W1.

A tilt angle of the measuring device main body 10 can be reliably modified and adjusted by the swivel plate 30. However, the vertical movement range (measurement range) of the stylus 12 is on the order of hundreds of micrometers. Therefore, when adjusting an orientation to bring the drive direction of the X slide mechanism 14 parallel with the measured surface W1, fine adjustments must be made within a range of hundreds of micrometers. In the end, the tilt angle of the measuring device main body 10 must be adjusted within a range of plus or minus 1°. However, in a case that only provides a rotation axis (tilt axis) such as the swivel plate 30, such fine adjustment is rather difficult and an operator overshoots and goes back several times to locate an appropriate position. This requires a fair amount of time and effort. When time and effort is required for tilt adjustment, work efficiency (measurement efficiency) is reduced.

SUMMARY OF THE INVENTION

The present invention provides a tilt angle adjuster supporting fine tilt angle adjustments when adjusting the tilt angle of a form measuring device.

A tilt angle adjuster according to the present invention is interposed between a Z slider and a measuring device main body when mounting the measuring device main body to the Z slider of a stand, the measuring device main body profiling and scanning a surface of a measured object with a contact pin. The tilt angle adjuster includes a base plate attached to the Z slider; a hanging plate attached to the measuring device main body; a thin coupling plate supporting the hanging plate such that the hanging plate is suspended on a first surface side of the base plate; a biaser biasing the hanging plate so as to impart a rotational force in a first direction to the hanging plate; and a micrometer head provided so as to push the hanging plate one of directly and indirectly toward a second direction opposite the direction of the rotational force imparted by the biaser.

In the present invention, the thin coupling plate preferably includes an arm, which is a long, thin plate having elasticity; and a coupling tab projecting from a center region of the arm. The coupling tab is preferably fixated to a top end surface of the base plate, and the arm preferably holds the hanging plate such that the hanging plate is suspended.

In the present invention, the arm preferably includes a rib provided at a right angle with respect to the thin plate of the arm.

In the present invention, preferably, the hanging plate includes a projecting pin; the base plate includes one of an aperture and a cut-away into which the pin is inserted; and the biaser is installed in the base plate so as to bias the pin inserted into the one of the hole and the cut-away.

In the present invention, where a location where the thin coupling plate is fixated to the base plate is a fulcrum, a position where the thin coupling plate and the hanging plate are connected is an action point, and a position where the micrometer head pushes against the hanging plate is a force point, a distance between the fulcrum and the action point is preferably equal to or less than a distance between the fulcrum and the force point.

The present invention preferably includes, in a vicinity of the base plate, a lever member supported so as to be capable of rotation with a predetermined rotation axis as the rotation axis; and, where the rotation axis of the lever member is a fulcrum, a point where the hanging plate pushes against the lever member is an action point, and a point where the micrometer head pushes against the lever member is a force point, the distance between the fulcrum and the action point is preferably equal to or less than the distance between the fulcrum and the force point.

In the present invention, preferably, the base plate has a rotating bearing configured by a first bearing provided to the Z slider, and the hanging plate has a rotating bearing configured by a second bearing coaxial with the first bearing.

The form measuring device of the present invention includes a measuring device main body profiling and scanning a surface of a measured object with a contact pin; a stand supporting the measuring device main body; and the tilt angle adjuster.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
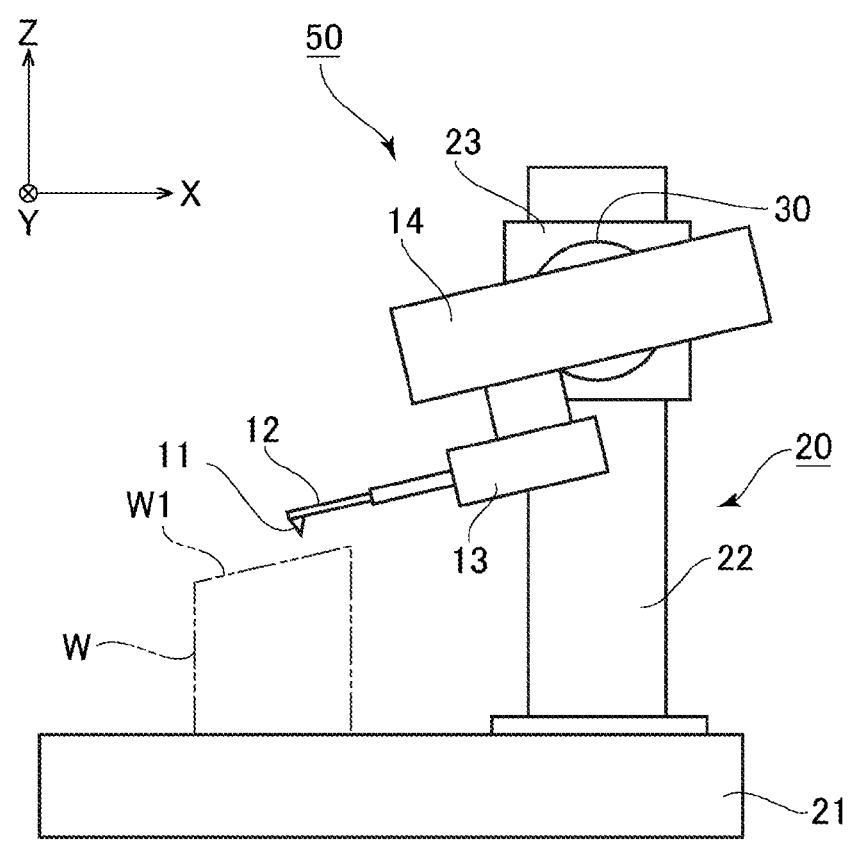
FIG. 1 illustrates a conventional surface characteristic measuring apparatus.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of embodiments of the present invention is given with reference to the drawings and to the reference numerals assigned to each component in the drawings.

First Embodiment

Figure 2:
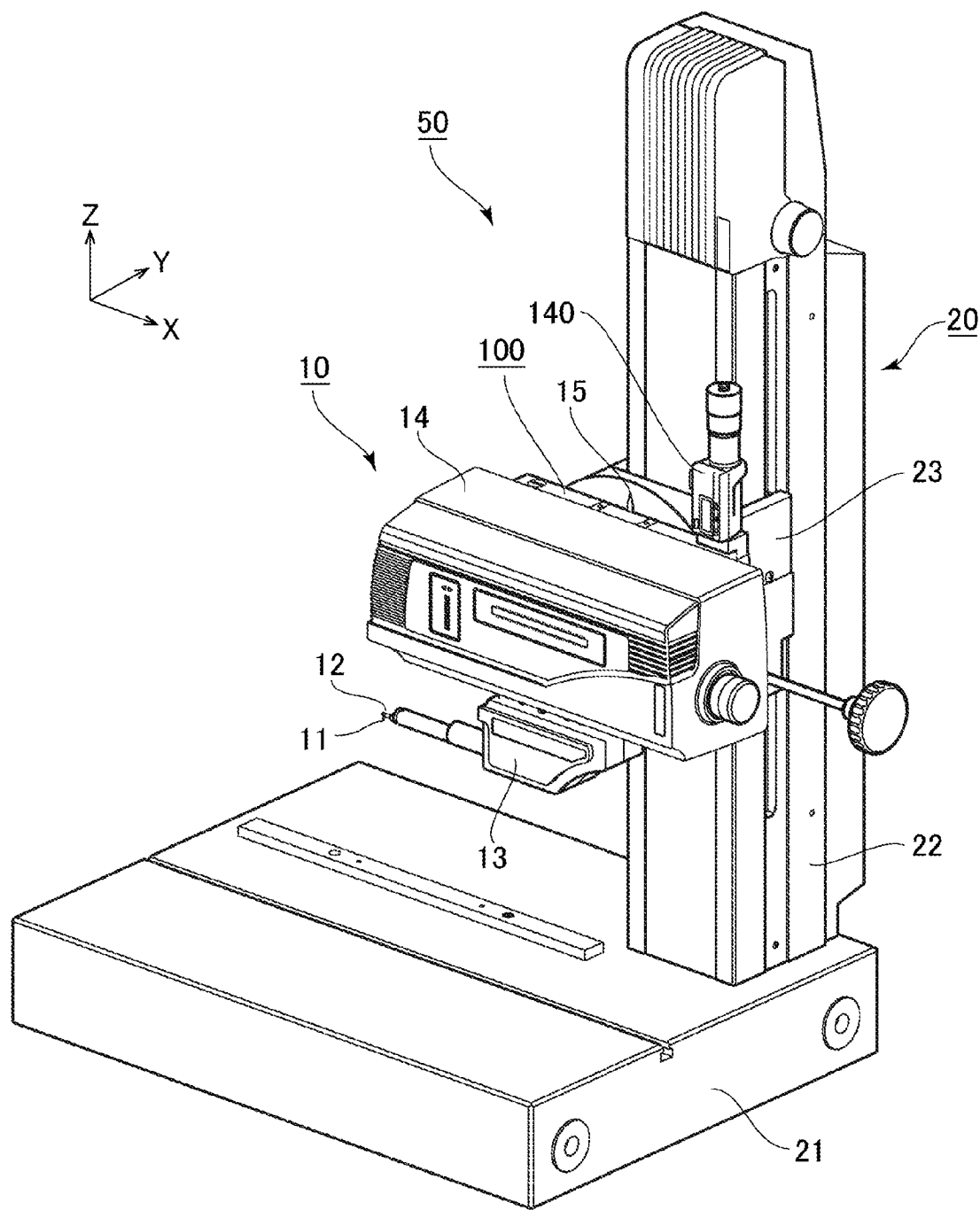
FIG. 2 is an overall external view of a surface characteristic measuring apparatus.

A description is given of a tilt angle adjuster of a surface characteristic measuring apparatus (form measuring device) according to a first embodiment of the present invention. FIG. 2 is an overall external view of a surface characteristic measuring apparatus 50 having a tilt angle adjuster 100 provided between a Z slider 23 and an X slide mechanism 14. A measuring device main body 10 and a support stand 20 are substantially identical to configurations described in the background art, and therefore are given identical reference numerals as the background art (FIG. 1) and a detailed description thereof is omitted.

Figure 3:
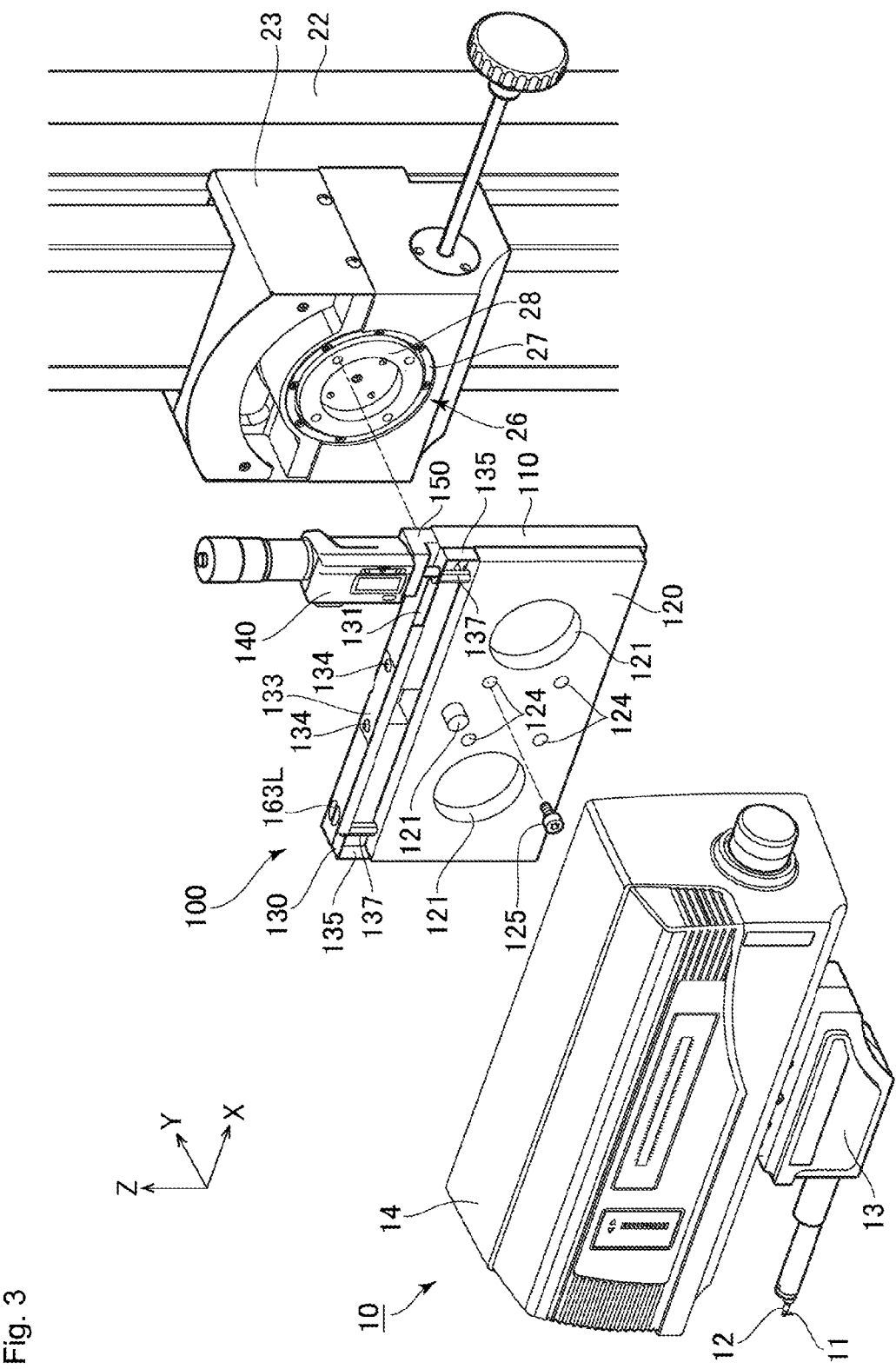
FIG. 3 is an exploded view separately showing a Z slider, a tilt angle adjuster, and a measuring device main body.

As shown in FIG. 2, the tilt angle adjuster 100 is provided between the Z slider 23 and the X slide mechanism 14. FIG. 3 is an exploded view separately showing the Z slider 23, the tilt angle adjuster 100, and the measuring device main body 10. A bearing assembly 26 is provided to an attachment surface of the Z slider 23, where the tilt angle adjuster 100 is attached, the bearing assembly 26 rotating centered on a rotation axis parallel to the Y axis. The bearing assembly 26 includes two bearings (27 and 28) provided coaxially. Specifically, the inner bearing 28 is positioned to an interior of the outer bearing 27.

Figure 4:
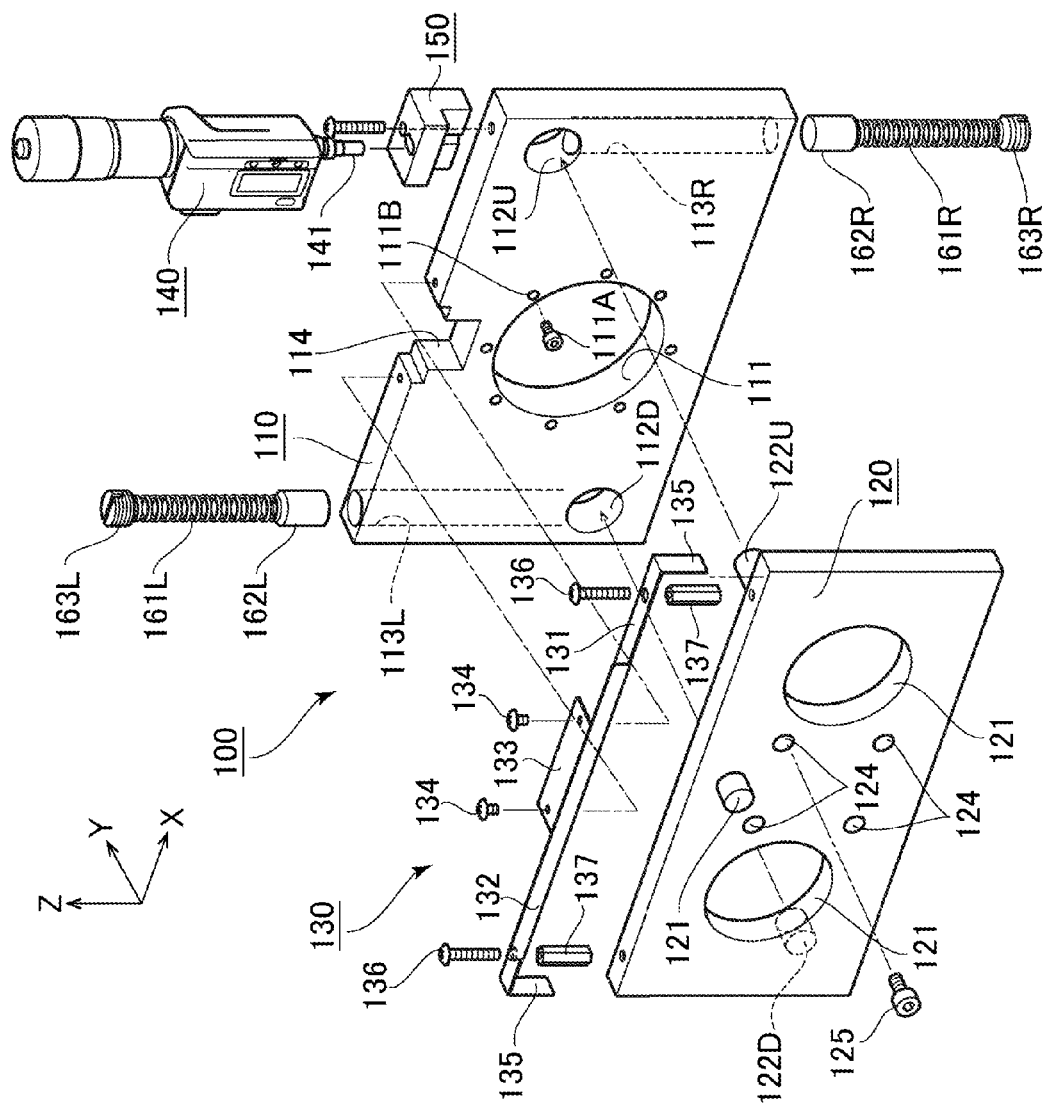
FIG. 4 is an exploded perspective view of the tilt angle adjuster.

Next, FIG. 4 is an exploded perspective view of the tilt angle adjuster 100. The tilt angle adjuster 100 includes a base plate 110, a hanging plate 120, a thin coupling plate 130, a micrometer head 140, a head holder 150, and coil springs (biasers) 161R and 161L. As defined herein, a spring 161R and 161L is any elastic body or device that recovers its original shape when released after being distorted, and is not limited to a coil spring. Rather, the spring 161R and 161L is only an example of an elastic member or elastomer. In other words, different types of springs of any suitable material or configuration can be used.

The base plate 110 is a rectangular plate. The base plate 110 includes a center hole 111, through-holes 112U and 112D, and insertion holes 113R and 113L.

The center hole 111 is bored in substantially the center of the base plate 110, the center hole 111 enabling the inner bearing 28 of the bearing assembly 26 to be inserted therein. In addition, a plurality of attachment holes 111B enabling the base plate 110 to be attached to the outer bearing 27 are provided around a periphery of the center hole 111, and attachment screws 111A are screwed into the outer bearing 27 through the attachment holes 111B. This enables the base plate 110 to tilt with respect to the Z slider 23, with an axis parallel to the Y axis as a rotation axis.

The base plate 110 includes, on two opposite corners, the through-holes 112U and 112D, which pass through a front surface to a back surface. (In other words, an axis line of the through-holes 112U and 112D is parallel to the Y axis.) In FIG. 4, the through-hole on a top right side is designated as the upper through-hole 112U, whereas the through-hole on a bottom left side is designated as the lower through-hole 112D. Pins 122U and 122D on the hanging plate 120 are inserted into the through-holes 112U and 112D. The effect of the pins 122U and 122D is described below.

Furthermore, the base plate 110 includes the insertion holes 113R and 113L, which pass through a lateral surface and the through-holes 112U and 112D, respectively. In FIG. 4, the insertion hole 113R is bored parallel to the Z axis, from the bottom lateral surface of the base plate 110 toward the upper through-hole 112U. Likewise, the insertion hole 113L is bored parallel to the Z axis, from the top lateral surface of the base plate 110 toward the lower through-hole 112D. The coil springs 161R and 161L are inserted into the insertion holes 113R and 113L. The effect of the coil springs 161R and 161L is described below.

The hanging plate 120 is a rectangular plate. The hanging plate 120 is arranged on a front surface side of the base plate 110 (a first surface side, surface facing a negative Y axis direction). The hanging plate 120 includes, on the front surface (surface facing the negative Y axis direction) thereof, a coupler 121 to couple the hanging plate 120 with the X slide mechanism 14 of the measuring device main body 10. The coupler 121 is a pin and a plurality of holes provided to the front surface side of the hanging plate 120. The measuring device main body 10 (X slide mechanism 14) and hanging plate 120 are fixedly attached to each other by the coupler 121. In addition, a plurality of attachment holes 124 enabling the hanging plate 120 to be attached to the inner bearing 28 are provided at substantially the center of the hanging plate 120, and attachment screws 125 are screwed into the inner bearing 28 through the attachment holes 124. This enables the hanging plate 120 to tilt with an axis parallel to the Y axis as a rotation axis.

The hanging plate 120 includes pins 122U and 122D on two opposite corners on a rear surface thereof (surface facing a positive Y axis direction). In FIG. 4, the pin on a top right side is designated as the upper pin 122U, whereas the pin on a bottom left side is designated as the lower pin 122D. The pins 122U and 122D on the hanging plate 120 are inserted into the through-holes 112U and 112D. The effect of the pins 122U and 122D is described below.

The thin coupling plate 130 is a thin plate having elasticity and, overall, is a long, thin plate having length in a direction parallel to the X axis in FIG. 4. The thin coupling plate 130 is fixated to a top end surface of the base plate 110, and suspends the hanging plate 120 on a front surface side of the base plate 110.

The thin coupling plate 130 includes an arm 131, a rib 132, a coupling tab 133, and an end tab 135.

The arm 131 is a long, thin plate having length in a direction parallel to the X axis in FIG. 4. The rib 132 is a flat plate provided at a right angle to the thin plate of the arm 131 and, except for regions at both ends of the arm 131, the rib 132 stands upright along the entire center region of the arm 131. The rib 132 may be prepared as a separate component from the arm 131 and attached to the arm 131; however, in a case where the thin coupling plate 130 is configured with a piece of metal, the rib 132 is preferably formed by bending.

A height, thickness, length, or the like of the rib 132 are adjusted as appropriate according to the rigidity, strength, and elasticity sought for the arm 131. As may be understood from the following description, the arm 131 does not benefit from excessive flexure under the weight of the measuring device main body 10. The arm 131 requires sufficient rigidity to withstand the weight of the measuring device main body 10. Meanwhile, when a force is applied to an end of the arm 131, the arm 131 requires sufficient flexibility to (curve) deform slightly between the coupling tab 133 and the arm 131.

The coupling tab 133 is a thin plate projecting in the positive Y direction from the center region of the arm 131. In addition, the coupling tab 133 is fixated by screws (134) to the top end surface of the base plate 110 (see FIG. 5). (The coupling tab 133 has a certain amount of width in the X axis direction (front-back direction), and so is fixated by two screws 134.) The thin coupling plate 130 is supported in a cantilever on the top end surface of the base plate 110, and the arm 131 is in a situation overhanging the front surface side of the base plate 110.

A portion of the top end surface of the base plate 110 is notched (114), creating a hole between the coupling tab 133 and the top end surface of the base plate 110. This hole allows a pointer 15 (see FIG. 2, for example) to be passed therethrough, the pointer 15 being attached to the measuring device main body 10 (X slide mechanism 14). For example, when angle scale marks are provided to the Z slider 23, the tilt angle of the measuring device main body 10 can be read from a value indicated by the pointer 15.

The end tabs 135 are formed by bending both ends of the arm 131 (both ends in the X axis direction) in the negative Z direction.

The hanging plate 120 is attached to the arm 131. The arm 131 and the hanging plate 120 are coupled by a screw 136 at locations proximate to each of the two ends of the arm 131. Specifically, the screws 136 inserted through the arm 131 are threaded into the top end surface of the hanging plate 120. However, a spacer 137 is interposed between the arm 131 and the hanging plate 120, preserving a gap between the arm 131 and the hanging plate 120. This gap is provided so as to allow elastic deformation of the arm 131.

In addition, when the hanging plate 120 and the arm 131 are coupled, a forefront end of the end tabs 135 is configured to butt against the top end surface of the hanging plate 120.

When the hanging plate 120 and the arm 131 are coupled, the hanging plate 120 is suspended on a front surface side of the base plate 110. At this point, the pins 122U and 122D of the hanging plate 120 are inserted into the through-holes 112U and 112D of the base plate 110. Specifically, the pin 122U is inserted into the through-hole 112U and the pin 122D is inserted into the through-hole 112D. A diameter of the through-holes 112U and 112D is sufficiently larger than a diameter of the pins 122U and 122D such that, when the pins 122U and 122D are in the through-holes 112U and 112D, respectively, a sufficient space remains around the pins 122U and 122D.

Figure 5:
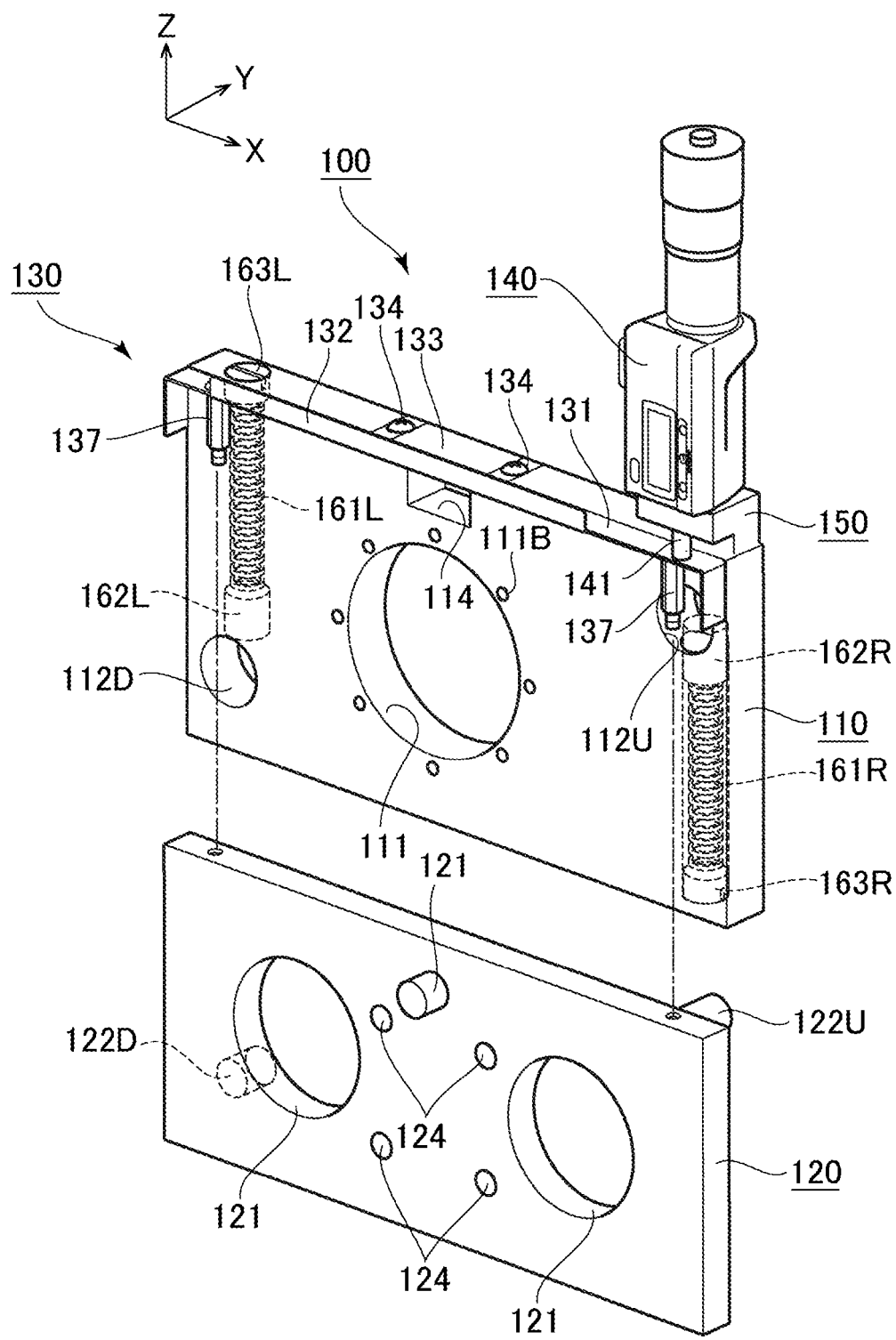
FIG. 5 is an exploded perspective view of the tilt angle adjuster.

The micrometer head 140 is attached to the top end surface of the base plate 110 by the head holder 150 (see FIG. 5). An attachment position of the micrometer head 140 is toward a positive X direction edge on the top end surface of the base plate 110. The head holder 150 is an inverted L type, and when a first end of the head holder 150 is fixated to the top end surface of the base plate 110, a second end projects toward the front surface side of the base plate 110. The micrometer head 140 is supported by the head holder 150 in a state where an advance/retreat direction of a spindle 141 is parallel to the Z axis. In this state, the forefront end of the spindle 141 is configured to strike the arm 131 of the thin coupling plate 130 from above. Accordingly, when the spindle 141 advances, the end of the arm 131 is pressed downward, and when the spindle 141 retreats, the end of the arm 131 is restored due to the elasticity of the arm 131.

The coil springs (biasers) 161R and 161L are inserted into the insertion holes 113R and 113L, respectively. Specifically, the right coil spring 161R is inserted into the right insertion hole 113R, and the left coil spring 161L is inserted into the left insertion hole 113L. Push caps 162R and 162L are mounted to a forefront end of the coil springs 161R and 161L, respectively, and male screws 163R and 163L are mounted on a base end of the coil springs 161R and 161L, respectively. The coil springs 161R and 161L are inserted within the insertion holes 113R and 113L, respectively, and then are fixated to the insertion holes 113R and 113L by screwing in the male screws 163R and 163L. The push caps 162R and 162L then protrude into the through-holes 112U and 112D, respectively, from a lateral surface of the through-holes 112U and 112D. In this state, the pins 122U and 122D are inserted into the through-holes 112U and 112D, and therefore the push caps 162R and 162L butt against the lateral surface of the pins 122U and 122D, respectively. The push caps 162R and 162L are then biased by the elastic force of the coil springs 161R and 161L such that the lateral surface of the pins 122U and 122D are pushed up or pushed down, respectively. Specifically, the push cap 162R provided to the coil spring 161R pushes the pin 122U upward, whereas the push cap 162L provided to the coil spring 161L pushes the pin 122D downward.

Figure 6:
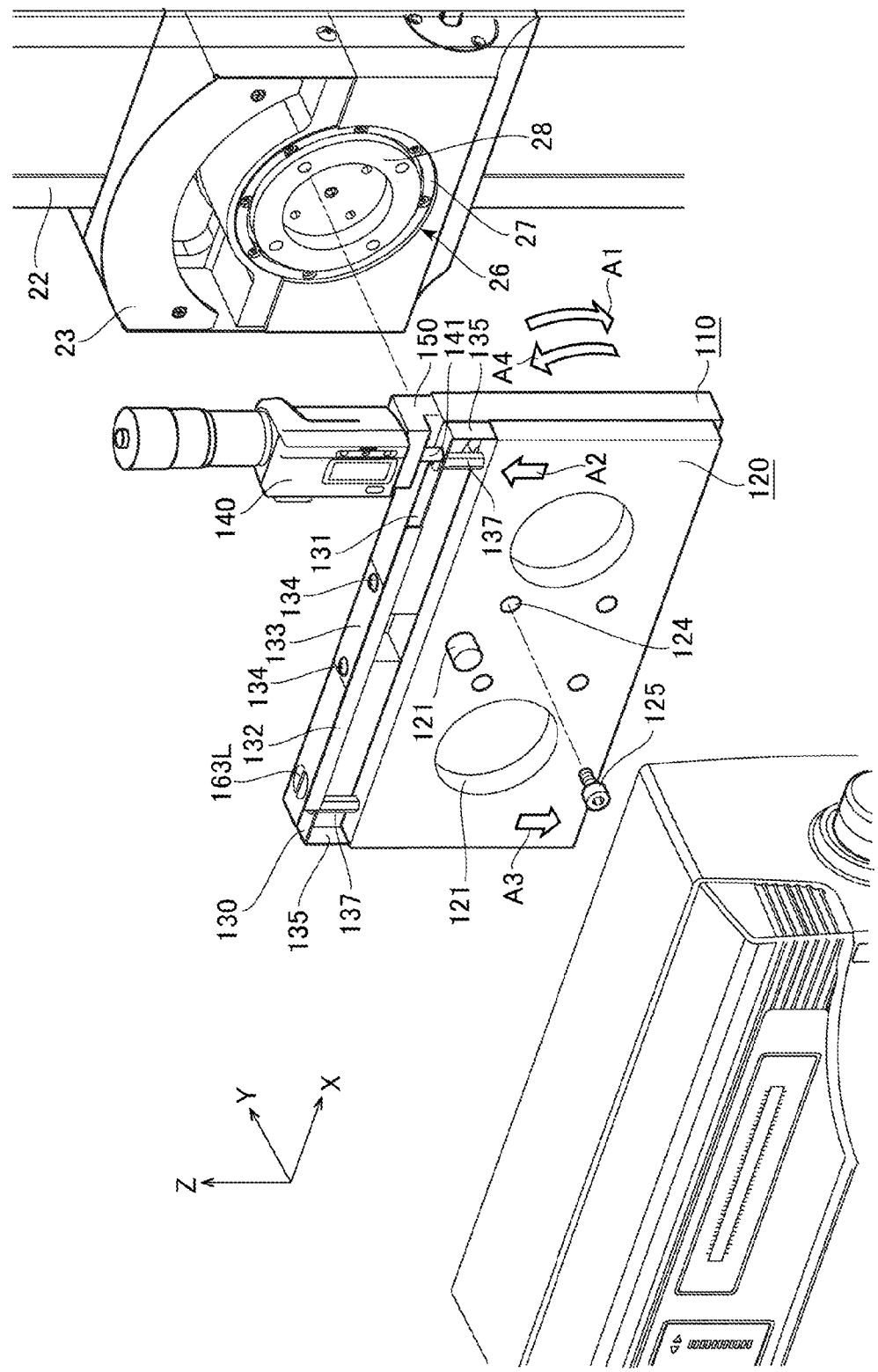
FIG. 6 is a perspective view of the tilt angle adjuster.

Effects of the tilt angle adjuster 100 having this configuration are described with reference to FIG. 6. In FIG. 6, the measuring device main body 10, the Z slider 23, and the tilt angle adjuster 100 are separated from each other; however, the reader is invited to imagine a situation such as that depicted in FIG. 2 in which the measuring device main body 10, the Z slider 23, and the tilt angle adjuster 100 are in an assembled state. (Because the tilt angle adjuster 100 is no longer visible when the three components are assembled, they are depicted in a separated state in FIG. 6 for ease of description and understanding.)

A tilt motion of the hanging plate 120 is considered. The hanging plate 120 is suspended by the thin coupling plate 130, and the coupling tab 133 of the thin coupling plate 130 is fixated to the base plate 110. In addition, the hanging plate 120 is coupled to the inner bearing 28. Accordingly, the hanging plate 120 is able to displace within a range allowed by the elasticity of the thin coupling plate 130, with rotation of the hanging plate 120 centered on the inner bearing 28. Specifically, the hanging plate 120 is able to rotationally displace (tilt) with rotation centered on the inner bearing 28.

The micrometer head 140 is installed such that the spindle 141 presses the right end of the arm 131. Accordingly, when the spindle 141 presses the right end of the arm 131, the arm 131 elastically deforms such that the right end of the arm 131 lowers. The forefront end of the end tab 135 then presses a top right corner of the hanging plate 120, and in association with this, the hanging plate 120 is rotationally displaced in a rightward rotation (clockwise, second direction) direction (see arrow A1 in FIG. 6).

The coil springs 161R and 161L present another force applied to the hanging plate 120. The coil spring 161R is inserted on the right of the base plate 110 and pushes up the pin 122U at the top right corner of the hanging plate 120 (see arrow A2 in FIG. 6). Similarly, the coil spring 161L is inserted on the left of the base plate 110 and pushes down the pin 122D at the bottom left corner of the hanging plate 120 (see arrow A3 in FIG. 6). Specifically, the coil springs 161R and 161L impart a biasing force to the hanging plate 120, causing the hanging plate 120 to rotate in a leftward rotation (counterclockwise, first direction) direction (see arrow A4 in FIG. 6). Accordingly, when the spindle 141 is withdrawn, the hanging plate 120 is rotationally displaced leftward (counterclockwise) by the biasing force of the coil springs 161R and 161L.

The spindle 141 is threaded together with the main body of the micrometer head 140, and therefore a noticeable force exists pushing in support of leftward rotation of the hanging plate 120 in opposition to the biasing force of the coil springs 161R and 161L (due to the force of friction of a screw threading).

In this way, a tilt amount of the hanging plate 120 due to an amount of advance/retreat of the spindle 141 can be adjusted in the rightward rotation direction as well as the leftward rotation direction. The measuring device main body 10 is mounted and fixated to the hanging plate 120, which means that the tilt of the measuring device main body 10 can be finely adjusted. A resolution of this fine adjustment corresponds to a threading pitch of the spindle 141 and is 1 mm or less, and when converted into a rotation angle, enables fine adjustment in units of approximately 0.1°.

During a measurement task, the entire base plate 110 is first rotated to adjust an approximate tilt angle, then the spindle 141 of the micrometer head 140 is advanced or retreated to finely adjust the tilt angle. For example, when the approximate tilt angle has been adjusted, a preliminary measurement is taken of a tilted surface W1 to be measured. A procedure may be envisioned in which, looking at measurement results, the tilt angle of the measuring device main body 10 is finely adjusted such that unevenness on the measured surface W1 is brought into the center of a measurement range.

Second Embodiment

Figure 7:
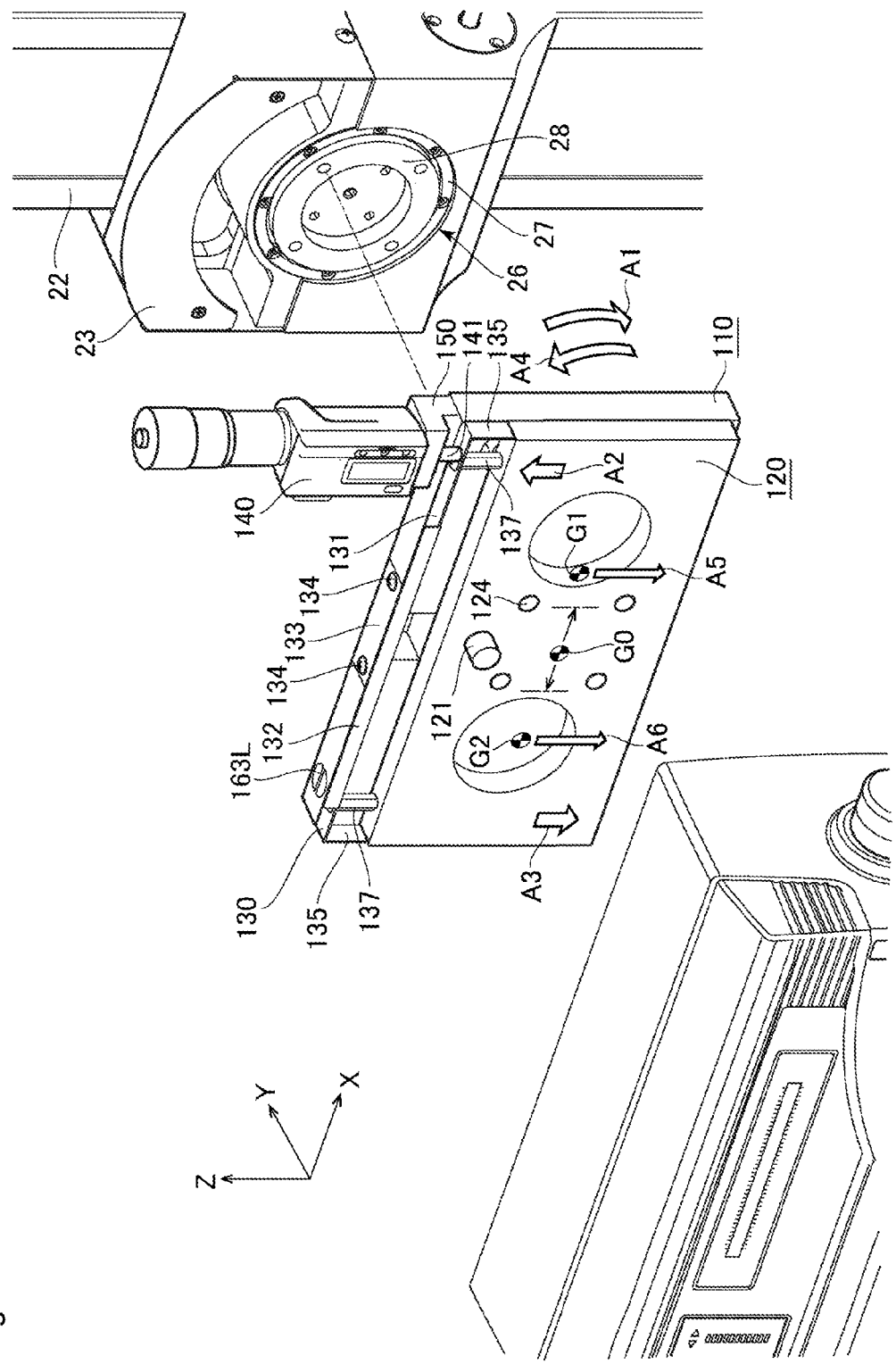
FIG. 7 illustrates a change in force associated with a position of a center of gravity.

A description of a second embodiment of the present invention follows. An orientation of the measuring device can be finely adjusted using the first embodiment, described above; however, a further improvement is provided as a second embodiment, with reference to FIG. 7. A center of gravity G of the measuring device main body 10 is shown in FIG. 7. Generally speaking, the center of gravity of the measuring device main body 10 is at substantially a center of a front/back direction. Specifically, the center of gravity is at a position indicated by G0 in FIG. 7. The weight of the measuring device main body 10 does not generate a large rotational force (torque) while the center of gravity G0 is positioned close to a center of rotation, and because the coupling tab 133 has a certain width in the front/back direction (X axis direction), even when the center of gravity G0 of the measuring device main body 10 deviates forward or backward to a certain degree, the measuring device main body 10 is adequately supported.

An issue may arise when the center of gravity deviates greatly. (For example, in a case where the center of gravity deviates to a point outside the coupling tab 133.) When the measuring device main body 10 is large and a stroke of the stylus 12 becomes longer, there is also a possibility of the center of gravity displacing significantly in the front/back direction (X axis direction).

For example, a case may be imagined in which the center of gravity of the measuring device main body 10 deviates in the positive X direction and reaches a center of gravity G1. At this point, the offset of the center of gravity G1 may give rise to a clockwise rotational force such as that shown by an arrow A5 in FIG. 6. A clockwise rotational force of this kind can be absorbed by the counterclockwise force (arrow A4) associated with the coil springs 161R and 161L, which resolves the issue.

In contrast, a case may be imagined in which the center of gravity of the measuring device main body 10 deviates in the negative X direction and reaches a center of gravity G2. The offset of the center of gravity G2 may give rise to a counterclockwise rotational force such as that shown by an arrow A6 in FIG. 6. Only the spindle 141 absorbs the counterclockwise rotational force. The rotational force caused by the displacement of the center of gravity G2 and the biasing force of the coil springs 161R and 161L must be absorbed by the spindle 141 alone. When this occurs, an excessive force is placed on the micrometer head 140, deforming components or deteriorating accuracy of the micrometer head 140 itself. As a result, accuracy of the tilt angle adjustment may also deteriorate.

Figure 8:
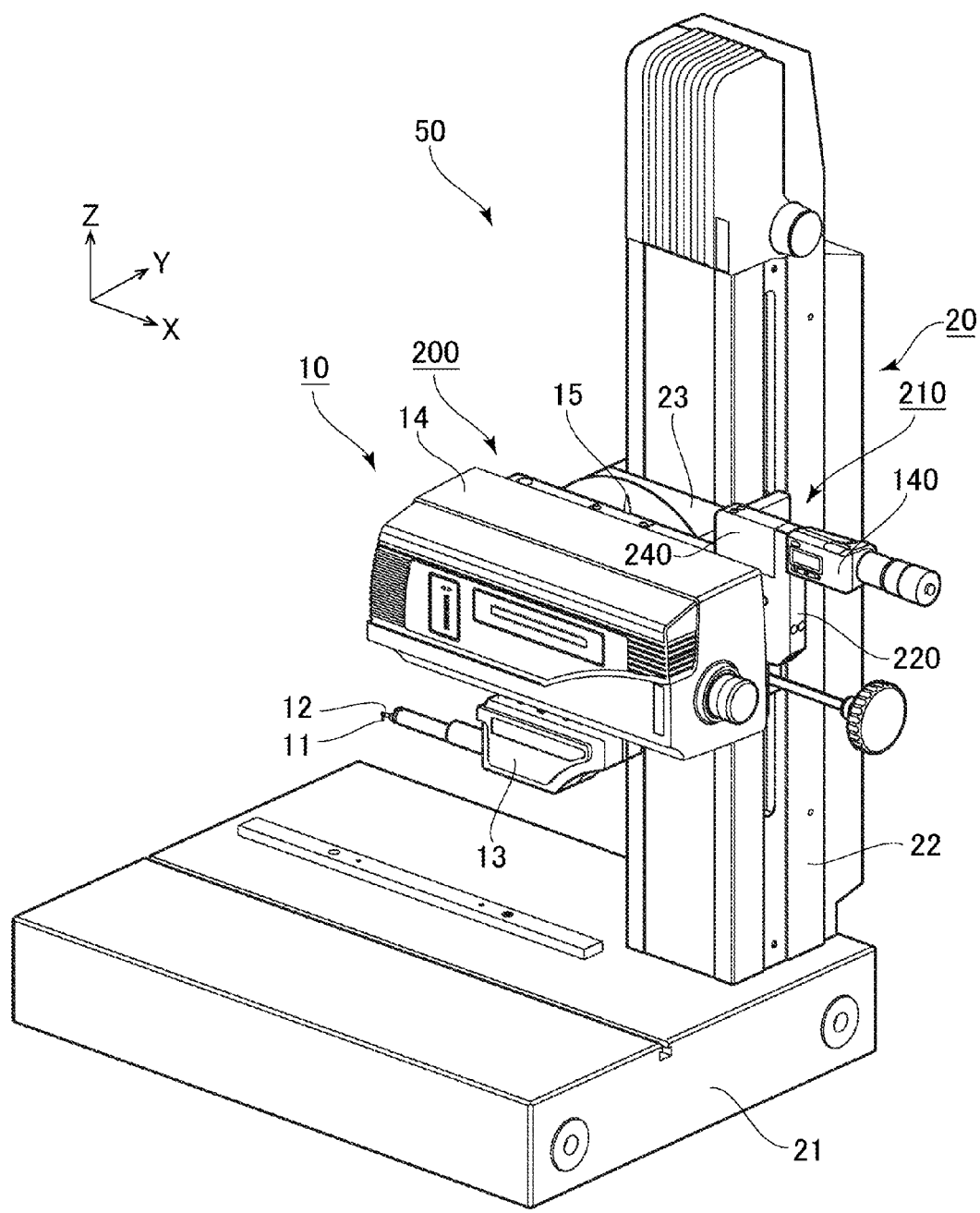
FIG. 8 illustrates a tilt angle adjuster according to a second embodiment.

The second embodiment is shown in FIGS. 8 to 11. FIG. 8 illustrates a tilt angle adjuster 200 according to the second embodiment, interposed between the Z slider 23 and the measuring device main body 10. The basic configuration of the tilt angle adjuster 200 is the same as that of the first embodiment, and so identical reference numerals are assigned to corresponding elements.

Figure 9:
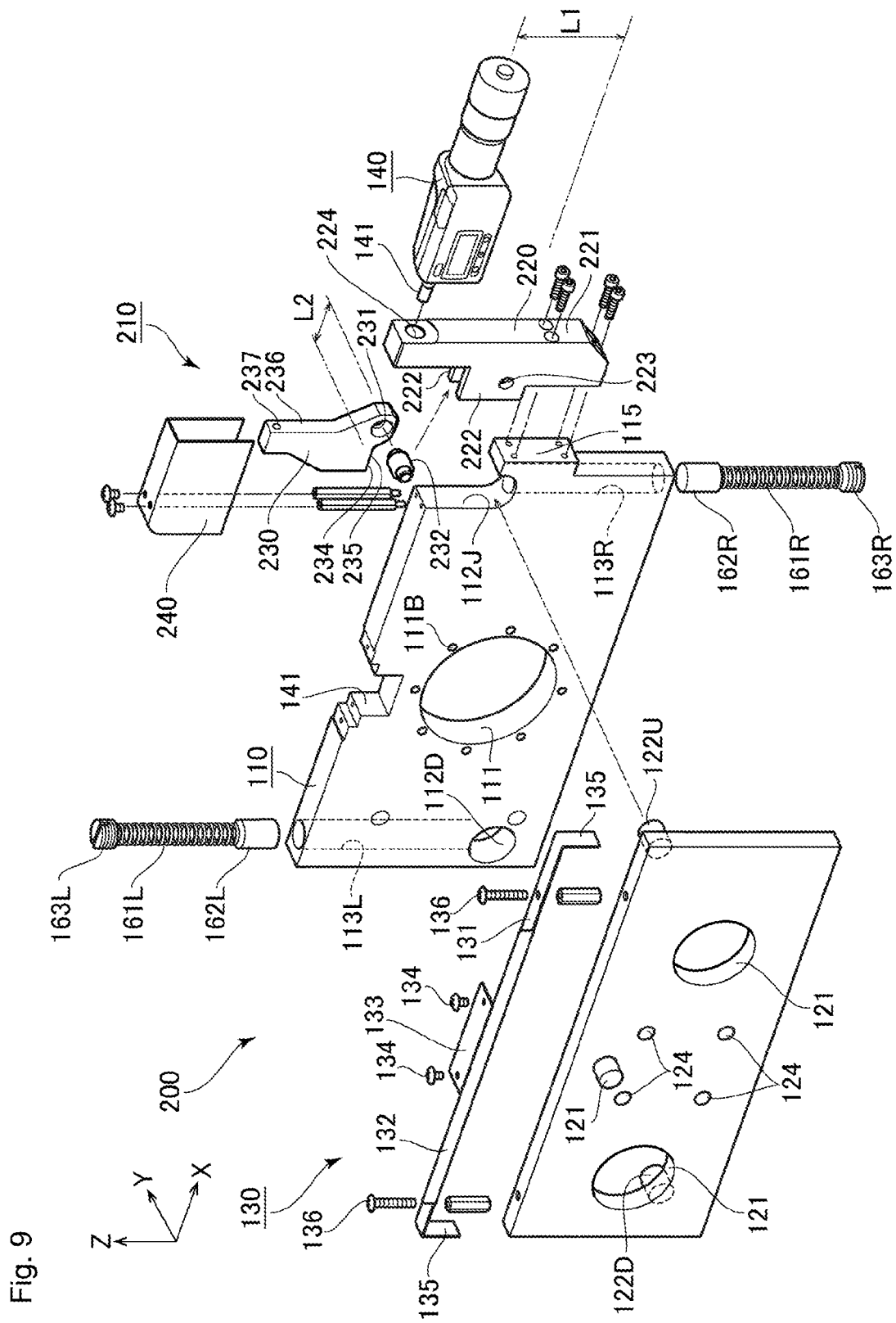
FIG. 9 is an exploded perspective view of the tilt angle adjuster according to the second embodiment.
Figure 10:
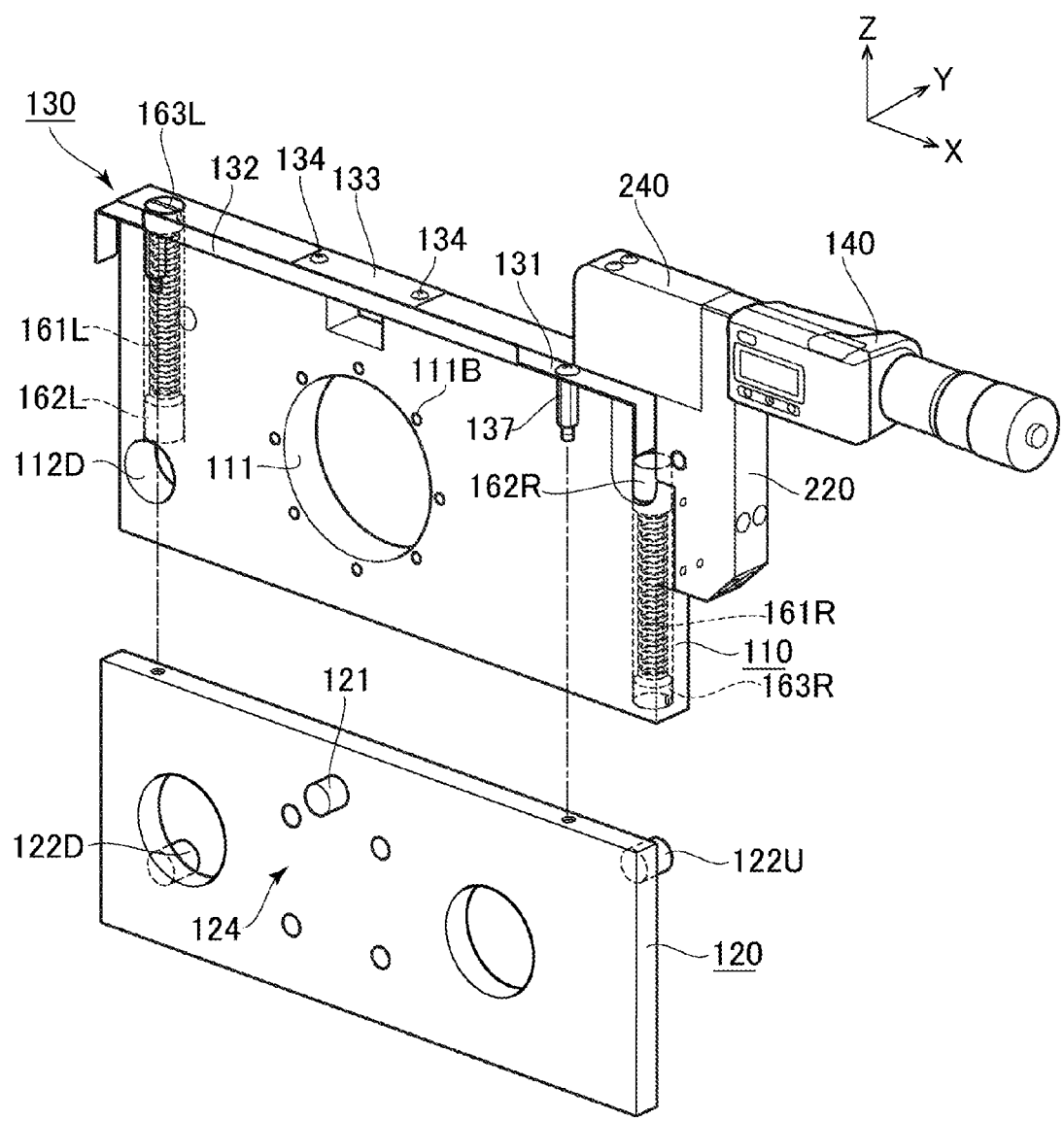
FIG. 10 is an exploded perspective view of the tilt angle adjuster according to the second embodiment.

FIGS. 9 and 10 are exploded perspective views of the tilt angle adjuster 200. The base plate 110, hanging plate 120, thin coupling plate 130, and coil springs 161R and 161L are similar to those of the first embodiment.

There is, however, a slight change to the shape of the base plate 110. A top right corner of the base plate 110 is cut away so as to leave a position corresponding to the upper through-hole 112U in a "J" shape. In other words, the top right corner of the base plate 110 is empty space. This cut-away is designated as a notch 112J. The right insertion hole 113R communicates with a bottom surface of the notch 112J. The push cap 162R on the forefront end of the coil spring 161R is passed through the right insertion hole 113R so as to protrude from the bottom surface of the notch 112J.

In addition, a mounting block 115 is formed projecting somewhat at substantially a vertical-direction center of the right side surface.

A primary feature of the second embodiment is a head holder assembly 210. The head holder assembly 210 includes a holder 220, a lever member 230, and a hood 240.

The holder 220 is attached to the right side surface of the base plate 110 and supports the micrometer head 140 in a horizontal orientation. The holder 220 includes an attachment portion 221, a bearing hole 223, and a spindle insertion hole 224. In FIG. 9, the holder 220 is a member that is long in the vertical direction and a lower end of the holder 220 configures the attachment portion 221, which is screwed to the mounting block 115.

In addition, support tabs 222 are provided to substantially a center in the vertical direction of the holder 220, the support tabs 222 opposing each other with a gap therebetween in the width direction (Y axis direction). The bearing hole 223 is bored into each support tab 222. (An axis line of the bearing holes 223 is parallel to the Y axis.) Furthermore, the spindle insertion hole 224, which supports the micrometer head 140 in the horizontal orientation, is provided near the top end of the holder 220. The micrometer head 140 is supported by the holder 220 in an orientation where the advance/retreat direction of the spindle 141 is parallel to the X axis.

In this example, the holder 220 is long in the vertical direction, and the bearing holes 223 and spindle insertion hole 224 are separated by a predetermined distance in the vertical direction (Z axis direction). For ease of the description that follows, the interval between the bearing holes 223 and the spindle insertion hole 224 is designated L1.

The lever member 230 includes a shaft insertion hole 231, a bottom end surface 234, and a right end surface 236. An axis line of the shaft insertion hole 231 is parallel to the Y axis, and a rotation shaft 232 is inserted through the shaft insertion hole 231. In addition, the rotation shaft 232 configures a bearing in the bearing holes 223 of the support tabs 222. Accordingly, the lever member 230 is arranged in a position equivalent to the top right corner of the base plate 110. Moreover, the lever member 230 is capable of rotating centered on the bearing holes 223 of the support tabs 222.

The lever member 230 is arranged in a position equivalent to the top right corner of the base plate 110, and the bottom end surface of the lever member 230 is directly above the right insertion hole 113R. In addition, the notch 112J is provided to the top right corner of the base plate 110, and the pin 122U of the hanging plate 120 is inserted into the notch 112J. Accordingly, the pin 122U of the hanging plate 120 is pinched between the push cap 162 of the coil spring 161R coming from below and the bottom end surface 234 of the lever member 230. In other words, the push cap 162 pushes up against the pin 122U from below, and the pin 122U pushes up against the bottom end surface 234 of the lever member 230.

A position where the pin 122U strikes the bottom end surface 234 of the lever member 230 is designated a "push-up point." (Although very difficult to show in the drawings, reference numeral 235 has been assigned to a location corresponding to the push-up point in FIG. 9.) For ease of the description that follows, the interval between the bearing holes 223 of the lever member 230 and the push-up point 235 is designated L2. In addition, when the interval L1 between the bearing holes 223 and the spindle insertion hole 224 is compared with the interval L2, the intervals are designed such that L1>L2.

When the pin 122U pushes up against the bottom end surface 234 (push-up point 235) of the lever member 230, the lever member 230 rotationally displaces with rotation centered on the rotation shaft 232 (bearing holes 223). Specifically, the lever member 230 rotationally displaces clockwise (rightward rotation).

The holder 220 is positioned to the right of the lever member 230, and the spindle 141 of the micrometer head 140 abuts the right end surface of the lever member 230. Specifically, the spindle 141 presses the right end surface 236 of the lever member 230. When the spindle 141 pushes the right end surface 236 of the lever member 230, the lever member 230 rotationally displaces with rotation centered on the rotation shaft 232 (bearing holes 223). Specifically, the lever member 230 rotationally displaces counterclockwise (leftward rotation).

A position where the spindle 141 strikes the right end surface 236 of the lever member 230 is designated a spindle abutment point 237. The interval on the lever member 230 between the bearing holes 223 and the spindle abutment point 237 is necessarily identical to the interval L1 between the bearing holes 223 and the spindle insertion hole 224.

The hood 240 is attached to the top right corner of the base plate 110 so as to accommodate the lever member 230 on an interior of the hood 240.

Figure 11:
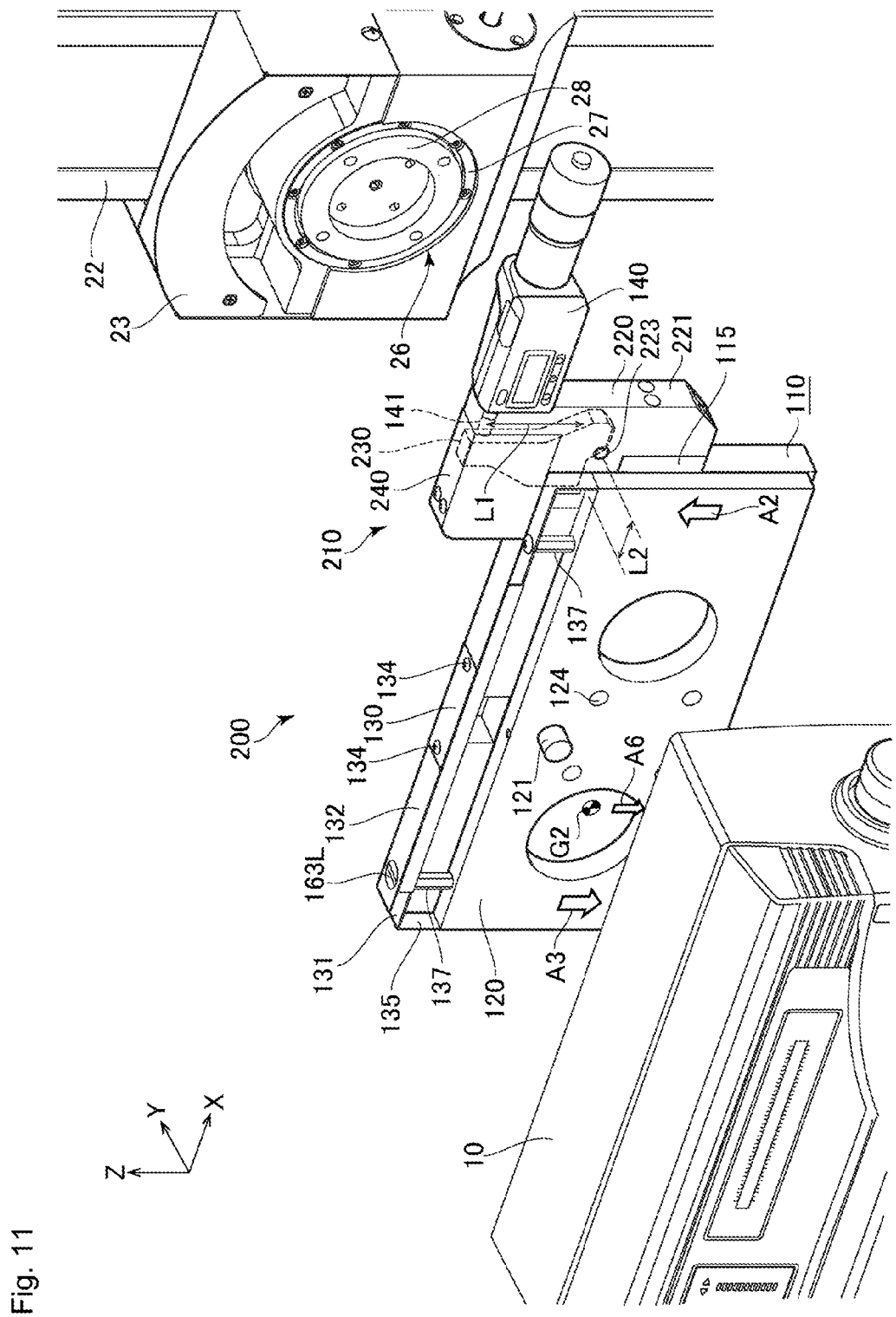
FIG. 11 illustrates a lever ratio.

Reference is now made to FIG. 11. A case may be imagined in which the center of gravity of the measuring device main body 10 deviates in the negative X direction and reaches the center of gravity G2. As described previously, imparting counterclockwise (leftward rotation) rotational force to the hanging plate 120 uses the biasing force of the coil springs 161R and 161L and displacement of the center of gravity G2. The pin 122U pushes up against the bottom end surface 234 (push-up point 235) of the lever member 230 due to this rotational force. This causes a force to be applied to the lever member 230 rotating the lever member 230 clockwise (rightward rotation) centered on the rotation shaft 232 (bearing holes 223).

The spindle 141 of the micrometer head 140 receives this clockwise (rightward) rotational force. In this example, emphasis is on a lever ratio associated with the lever member 230. The lever ratio of the lever member 230 is L1:L2, and is designed such that L1>L2. (L1 is the interval on the lever member 230 between the bearing holes 223 and the spindle abutment point 237. L2 is the interval on the lever member 230 between the bearing holes 223 and the push-up point 235.) Therefore, a load applied to the spindle abutment point 237 reduces to L2/L1 of the push-up force of the pin 122U. Accordingly, a situation in which an excessive load might be applied to the micrometer head 140 is eliminated, and accuracy of the micrometer head 140 can be adequately achieved and fine adjustments can be made to the tilt of the measuring device main body 10.

Moreover, an amount of displacement of the push-up point 235 (i.e., the pin 122U) with respect to an amount of displacement of the spindle 141 reduces to L2/L1. Accordingly, the tilt of the measuring device main body 10 can be even more finely adjusted than the resolution of the micrometer head itself.

First Modification

Figure 12:
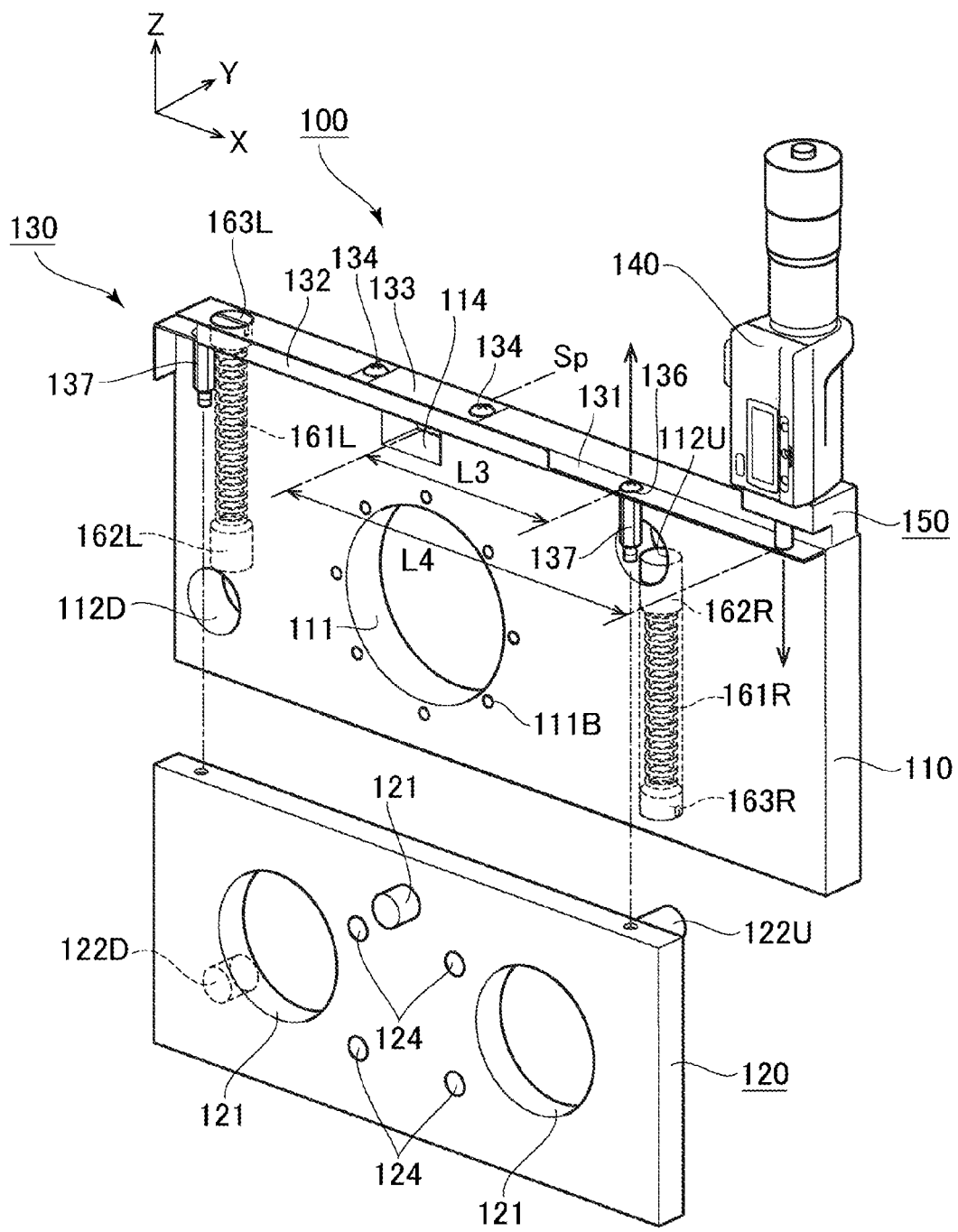
FIG. 12 illustrates a first modification.

FIG. 12 illustrates a modification. In the second embodiment, an example was given of using a first kind of lever (having a force point and an action point on opposite sides of a fulcrum), but a second kind of lever may also be used. For example, as shown in FIG. 12, the position of the micrometer head 140 in the first embodiment may be considered offset in the positive X direction. A distance L4 between the fulcrum (Sp) and the force point (spindle 141) is longer than a distance L3 between the fulcrum (Sp) and the action point (position where the hanging plate 120 and the arm 131 are connected). Accordingly, even in a hypothetical case where the center of gravity of the measuring device main body 10 deviates (in the negative X direction), the load applied to the micrometer head 140 can be reduced only by the lever ratio (L3/L4).

In this example, focus is primarily on the force applied to the thin coupling plate 130 and the coupling tab 133 is treated as the fulcrum Sp; however, the thin coupling plate 130 and the hanging plate 120 may be thought of as an integral body, and a center of rotation may be considered the fulcrum. So long as the force point (spindle 141) is further outward than the action point (position where the hanging plate 120 and the arm 131 are connected), the fulcrum Sp may be essentially anywhere.

Second Modification

Figure 13:
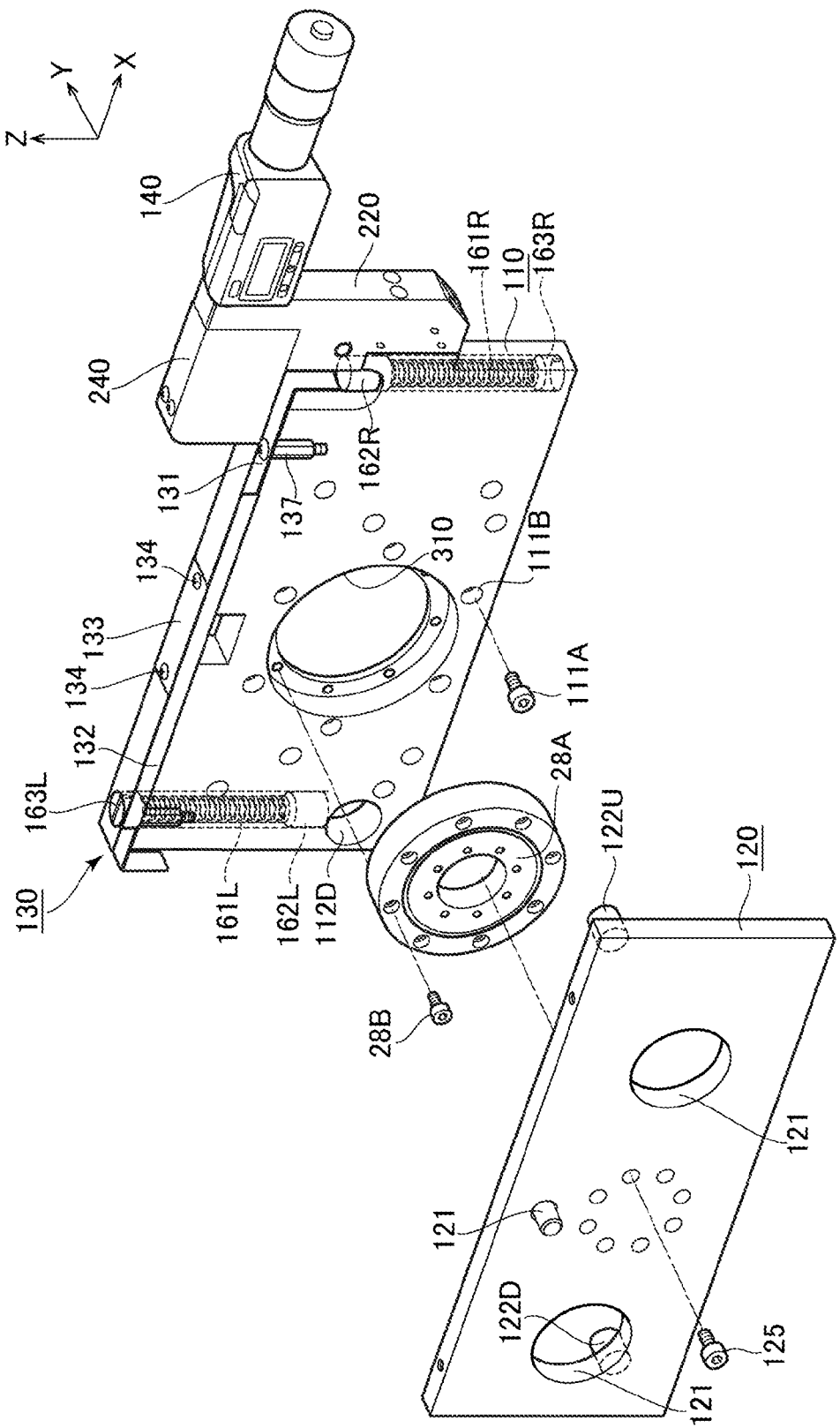
FIG. 13 illustrates a second modification.

FIG. 13 illustrates a second modification. In the second modification, the outer bearing 27 allowing the base plate 110 to rotate is provided to the Z slider 23 as in the above-described embodiments, and an inner bearing 28A is mounted on the base plate 110, the inner bearing 28A configuring a rotating bearing for the hanging plate 120. Naturally, effects similar to those of the above-described embodiments are achieved with this configuration, as well.

Third Modification

Figure 14:
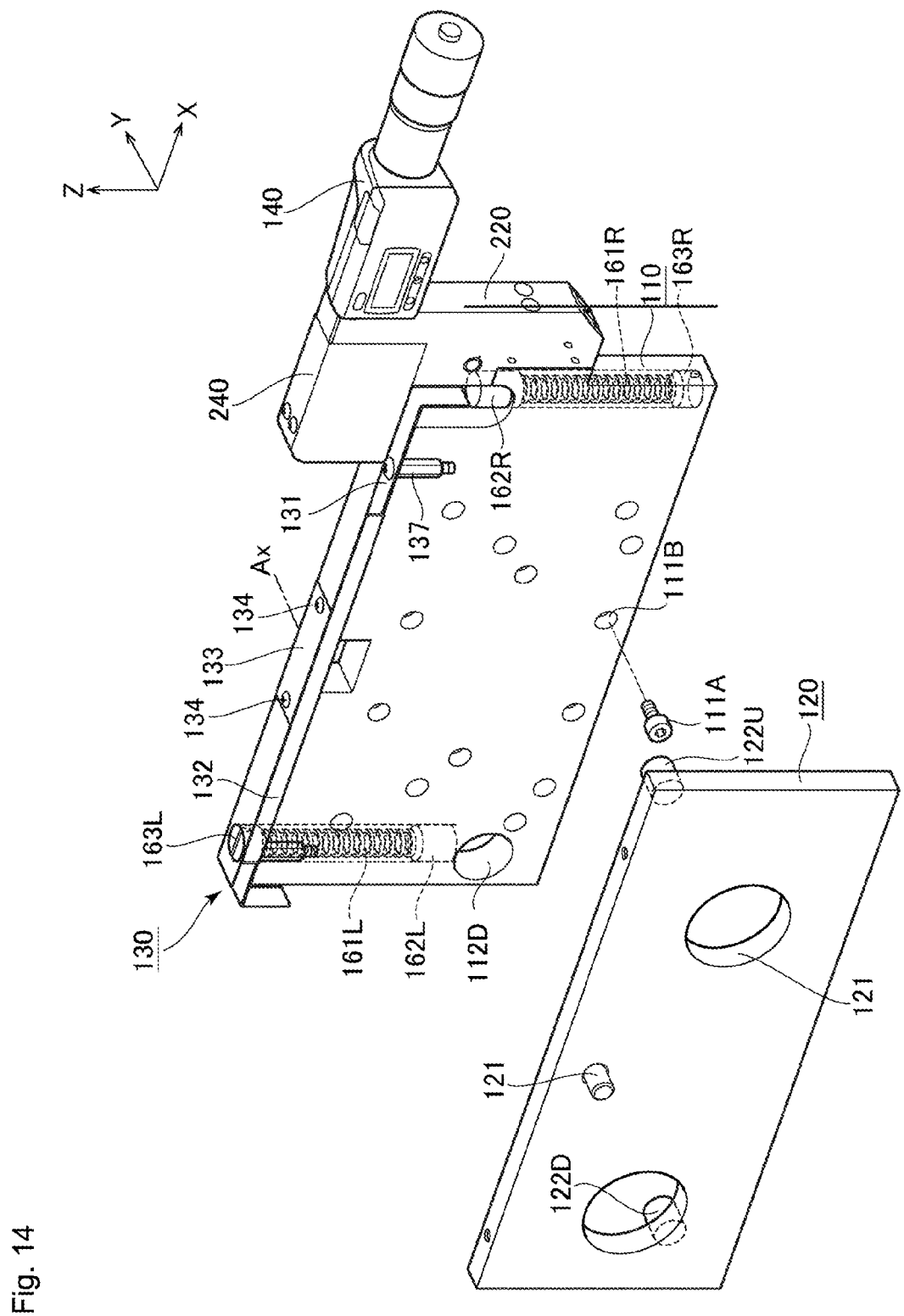
FIG. 14 illustrates a third modification.

FIG. 14 illustrates a third modification. In the above-described embodiments, the inner bearing 28 is provided as the center of rotation of the hanging plate 120, but the inner bearing 28 may also be omitted, as shown in the third modification. In such a case, the coupling tab 133 of the thin coupling plate 130 becomes the center of rotation of the hanging plate 120.

Moreover, the present invention is not limited to the embodiments described above, and may be modified as needed without departing from the scope of the present invention. For example, rubber or a plate spring may be used instead of the coil springs 161R and 161L.

In the first embodiment, the micrometer head presses directly against the thin coupling plate 130 (arm 131), and the arm 131 presses (a corner of) the hanging plate. However, a configuration is also possible in which the micrometer head (spindle 141) presses directly against the hanging plate.

In the second embodiment, the rotation axis of the lever is parallel to the Y axis. However, the direction of the rotation axis is not particularly limited. (Because the micrometer head includes a thimble, care must simply be taken that the thimble does not impede measurement.)

In the embodiments described above, an example was given in which the micrometer head pushes down on the hanging plate from above. The direction of the force with which the micrometer head pushes the hanging plate should be the opposite of the biasing force of the biaser, and therefore a configuration is also possible in which the micrometer head pushes up on the hanging plate from below, for example. In such a case, a method may be imagined in which, for example, design modifications are made such that the micrometer head is provided below a left corner.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A tilt angle adjuster interposed between a Z slider and a measuring device main body when mounting the measuring device main body to the Z slider of a stand, the measuring device main body profiling and scanning a surface of a measured object with a contact pin, the tilt angle adjuster comprising:
a base plate attached to the Z slider;
a hanging plate attached to the measuring device main body;
a coupling plate supporting the hanging plate such that the hanging plate is suspended on a first surface side of the base plate;
a spring configured to bias the hanging plate so as to impart a rotational force in a first direction to the hanging plate; and
a micrometer head configured to push the hanging plate one of directly and indirectly toward a second direction opposite the direction of the rotational force imparted by the spring.

2. The tilt angle adjuster according to claim 1, wherein the coupling plate comprises:
an arm comprising an elongated plate and having elasticity; and
a coupling tab projecting from a center region of the arm, wherein:
the coupling tab is fixed to a top end surface of the base plate, and
the arm is configured to hold the hanging plate such that the hanging plate is suspended.

3. The tilt angle adjuster according to claim 2, wherein the arm further comprises a rib provided at a right angle with respect to the elongated plate of the arm.

4. The tilt angle adjuster according to claim 1, wherein:
the hanging plate comprises a projecting pin;
the base plate comprises one of an aperture and a cut-away into which the pin is inserted; and
the spring is positioned in the base plate so as to bias the pin inserted into the one of the aperture and the cut-away.

5. The tilt angle adjuster according to claim 1, wherein:
- a location at which the coupling plate is fixated to the base plate is a fulcrum, a position at which the coupling plate and the hanging plate are connected is an action point, and a position at which the micrometer head pushes against the hanging plate is a force point; and
- a distance between the fulcrum and the action point is generally equal to or less than a distance between the fulcrum and the force point.

6. The tilt angle adjuster according to claim 1, further comprising a lever provided in a vicinity of the base plate, the lever being supported so as to be capable of rotation with a predetermined rotation axis as the rotation axis, wherein:
- the rotation axis of the lever is a fulcrum, a point at which the hanging plate pushes against the lever is an action point, and a point at which the micrometer head pushes against the lever is a force point; and
- a distance between the fulcrum and the action point is generally equal to or less than a distance between the fulcrum and the force point.

7. The tilt angle adjuster according to claim 1, wherein:
- the base plate has a rotating bearing comprising a first bearing provided to the Z slider, and
- the hanging plate has a rotating bearing comprising a second bearing coaxial with the first bearing.

8. A form measuring device comprising:
- a measuring device main body configured to profile and scan a surface of a measured object with a contact pin;
- a stand configured to support the measuring device main body; and
- a tilt angle adjuster interposed between a Z slider and the measuring device main body when mounting the measuring device main body to the Z slider of the stand, the tilt angle adjuster comprising:
  - a base plate attached to the Z slider;
  - a hanging plate attached to the measuring device main body;
  - a coupling plate supporting the hanging plate such that the hanging plate is suspended on a first surface side of the base plate;
  - a spring configured to bias the hanging plate so as to impart a rotational force in a first direction to the hanging plate; and
  - a micrometer head configured to push the hanging plate one of directly and indirectly toward a second direction opposite the direction of the rotational force imparted by the spring.

9. The form measuring device according to claim 8 wherein the coupling plate comprises:
- an arm comprising an elongated plate and having elasticity; and
- a coupling tab projecting from a center region of the arm, wherein:
  - the coupling tab is fixed to a top end surface of the base plate, and
  - the arm is configured to hold the hanging plate such that the hanging plate is suspended.

10. The form measuring device according to claim 9, wherein the arm further comprises a rib provided at a right angle with respect to the elongated plate of the arm.

11. The form measuring device according to claim 8, wherein:
- the hanging plate comprises a projecting pin;
- the base plate comprises one of an aperture and a cut-away into which the pin is inserted; and
- the spring is positioned in the base plate so as to bias the pin inserted into the one of the aperture and the cut-away.

12. The form measuring device according to claim 8, wherein:
- a location at which the coupling plate is fixated to the base plate is a fulcrum, a position at which the coupling plate and the hanging plate are connected is an action point, and a position at which the micrometer head pushes against the hanging plate is a force point; and
- a distance between the fulcrum and the action point is generally equal to or less than a distance between the fulcrum and the force point.

13. The form measuring device according to claim 8, wherein:
- the tilt angle adjuster further comprises a lever provided in a vicinity of the base plate, the lever being supported so as to be capable of rotation with a predetermined rotation axis as the rotation axis;
- the rotation axis of the lever is a fulcrum, a point at which the hanging plate pushes against the lever is an action point, and a point at which the micrometer head pushes against the lever is a force point; and
- a distance between the fulcrum and the action point is generally equal to or less than a distance between the fulcrum and the force point.

14. The form measuring device according to claim 8, wherein:
- the base plate has a rotating bearing comprising a first bearing provided to the Z slider, and
- the hanging plate has a rotating bearing comprising a second bearing coaxial with the first bearing.

* * * * *